Patented Mar. 11, 1941

UNITED STATES PATENT OFFICE 2,234,723

AZO COMPOUNDS AND MATERIAL COLORED THEREWITH

Joseph B. Dickey and William H. Strain, Rochester, N. Y., assignors to Eastman Kodak Company, Rochester, N. Y., a corporation of New Jersey No Drawing. Application October 11, 1939, Serial No. 298,958

13 Claims. (Cl. 260—156)

This invention relates to azo compounds and to fibrous materials such as cellulose organic derivatives, silk, wool, and cotton colored therewith. More particularly it relates to azo compounds having the general formula:

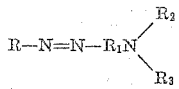

wherein R represents a member selected from the group consisting of an aryl nucleus of the benzene series, an aryl nucleus of the naphthalene series, an aryl nucleus of the azobenzene series, and an aryl nucleus of the benzene azo naphthalene series, $R_1$ represents a member selected from the group consisting of an aryl nucleus of the benzene series, and an aryl nucleus of the naphthalene series, $R_2$ represents a member selected from the group consisting of hydrogen, an alkyl group, a hydroxyalkyl group, an alkoxyalkyl group, an alkylene group, a cyclohexyl group, a phenyl group, and the group $R_3$, and $R_3$ represents a member selected from the group consisting of a pyridine nucleus joined to N by a nuclear carbon atom which is ortho, meta, or para to the nuclear nitrogen of the said nucleus, and a pyridine nucleus joined to N through a carbon atom of a short chain hydrocarbon group which is ortho, meta, or para to the nuclear nitrogen of the said nucleus. The various aryl nuclei may be substituted by one or more monovalent substituents including halogen represented by chlorine, bromine, and fluorine; nitro groups; alkyl groups represented by methyl, butyl, cetyl and the like groups; alkoxy groups represented by methoxy, ethoxy, and phenoxy groups; and acylamino groups represented by acetamino, propionylamino, butyrylamino, and similar kind of groups. The pyridine nuclei, in addition to carrying monovalent substituents of the above mentioned kind may also form quaternary salts with alkyl halides, phenylsulphonic acid alkyl esters, and similar kind of salt forming compounds. Many of these quaternary salt dyes possess the unique property of being surface active, which enables them to act in the capacity of being their own wetting agents in various processes involving their uses. Most of the above mentioned dyes are characterized by exceptionally good fastness to light.

It is an object of our invention, therefore, to prepare the class of azo compounds described and to color fibrous cellulose organic derivatives, silk, wool, and cotton in the form of threads, yarns, staple fibers, and fabric materials therewith.

The azo compounds of the invention may be prepared by coupling the diazo salts of various suitable arylamines with aryl compounds having the general formula:

wherein $R_1$, $R_2$, and $R_3$, have the meanings previously defined. The class of intermediates illustrated by the above formula, in the case where $R_3$ is a pyridine nucleus, may be obtained by condensing the desired nuclear halogenated pyridines or substituted halogenated pyridines with aniline, naphthylamine, or derivatives of these amines. In the case where $R_3$ represents an alkyl pyridine, the intermediates may be obtained, for example, by condensing an aminoalkyl pyridine with a phenol or a naphthol, or by condensing a haloalkylpyridine, or a hydroxyalkyl pyridine with the desired amine of the benzene or naphthalene series, or by condensing a pyridine alkyl aldehyde with the same type of amines, and reducing the product obtained in the presence of a hydrogenating catalyst.

The following examples illustrate the preparation of the azo compounds of our invention.

Example 1

1 mole of o-chloroaniline is diazotized with sodium nitrite and added to 1 mole of an aqueous hydrochloric acid solution of 2-m-toluido pyridine. After standing for a short time, the mixture is made alkaline with sodium acetate, and when the coupling reaction is complete, the dye is filtered off, and dried. Cellulose acetate is colored yellow shades from an aqueous suspension of the dye.

The azo compound obtained has the formula:

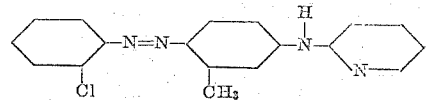

Example 2

1 mole of p-aminoacetophenone is diazotized and coupled with 1 mole of 4-(butylanilino-)-2-methylpyridine butyl bromide following the procedure of Example 1. Cellulose acetate is colored orange shades from an aqueous dispersion of the dye.

The azo compound has the formula:

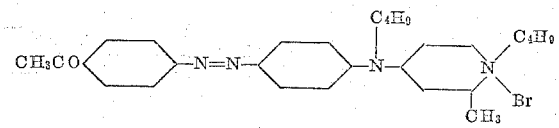

Dyes of the above quaternary salt type have the property of being their own wetting out agents. This is particularly true in the cases where the salt is formed with a higher molecular weight alkyl halide such as cetyl bromide.

*Example 3*

1 mole of p-nitro-o-chloroaniline is diazotized with sodium nitrite and coupled as in Example 1 with 1 mole of 2-(γ-hydroxypropyl-m-toluido-)-4,6-dimethyl pyridine. Cellulose acetate is colored rubine shades from an aqueous suspension of the dye.

The azo dye compound has the formula:

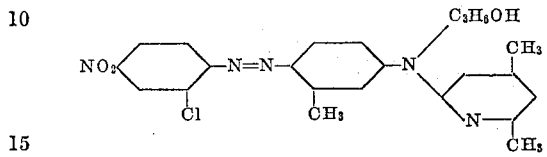

*Example 4*

1 mole of 2-amino-5-nitrophenyl methyl sulfone is diazotized and coupled as in Example 1 with 1 mole of 2-(5'-hydroxy-α-naphthylamino-)-pyridine. Cellulose acetate is colored greenish-blue shades from an aqueous suspension of the dye, which has the following formula:

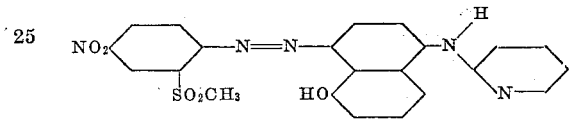

*Example 5*

1 mole of methyl anthranilate is diazotized with sodium nitrite and added with stirring to a dilute hydrochloric acid solution of 1 mole of 3-β-hydroxyethylanilinoethyl pyridine. After standing for a short time, the mixture is neutralized with sodium carbonate, and the dye filtered out and dried. Cellulose acetate is colored yellow shades from an aqueous suspension of the dye.

The azo compound has the formula:

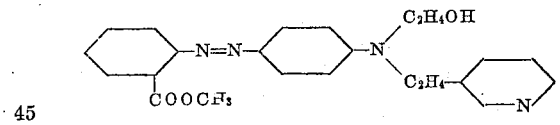

*Example 6*

1 mole of p-nitro-o-hydroxyaniline is diazotized and coupled in the usual manner with 1 mole of 2-cresidino-γ-propyl pyridine, the dye compound obtained coloring cellulose acetate pinkish-red shades from an aqueous suspension of the dye, and having the formula:

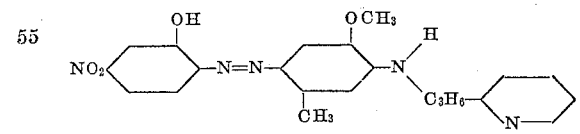

In place of the above coupling component, there may be substituted the isomeric 3-cresidinopropyl pyridine, and 4-cresidinopropyl pyridine.

*Example 7*

1 mole of 2.4-dinitro-6-bromoaniline is diazotized and coupled in the usual manner with 1 mole of 3-(5'-sulphonic acid-α-naphthylaminomethyl)-pyridine, the dye compound resulting therefrom coloring silk and wool blue shades from an aqueous solution of the dye, and having the formula:

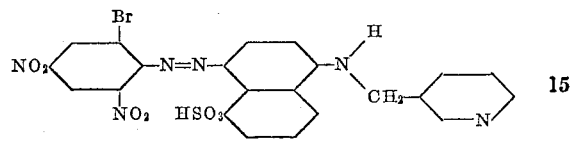

In place of the above coupling component, there may be substituted the isomeric compounds 2-(5'-sulphonic acid-α-naphthylaminomethyl)-pyridine and 4-(5'-sulphonic acid-α-naphthylaminomethyl)-pyridine.

*Example 8*

1 mole of p-nitroaniline is diazotized and coupled with 1 mole of 4-ethylanilinomethylpyridine, the dye resulting therefrom coloring cellulose acetate orange-red shades from an aqueous suspension of the dye. Compounds of this type can be reduced to the corresponding amines, in which form they can be used for impregnating and developing colors directly on the fibers of the materials to be colored. If 100 grams of a cellulose acetate fabric, for example, is immersed in an aqueous dispersion of 1 gram of the above dyestuff in its reduced form, the fabric acquires a yellow color, which by the steps of diazotizing with an aqueous acid solution of sodium nitrite, washing, and coupling with 2-hydroxy-3-naphthoic acid is changed to a deep black color. The dye compound formed on the fiber has the probable formula:

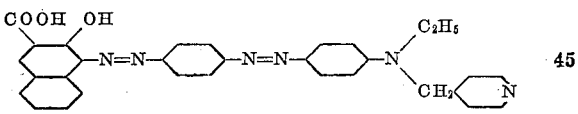

In place of 4-ethylanilinomethylpyridine, there may be substituted 3-ethylanilinomethylpyridine, 2-β-hydroxyethylanilinomethylpyridine, 3-cresidinomethylpyridine, 4-anilinoethylpyridine, 2-β-hydroxyethylanilinopropyl pyridine, and similar kind of pyridine compounds.

In order that the scope of our invention will be more fully apparent, we are disclosing in the following table a number of additional examples of suitable diazotization and coupling components, the dyes resulting therefrom coloring cellulose acetate fibers, unless otherwise indicated for silk, wool, and cotton, the shades of color designated.

| Diazotization components | Coupling components | Shade on cellulose acetate |
|---|---|---|
| Methyl anthranilate | 1. [phenyl-N(CH₃)-pyridyl] | Yellow. |
| o-Chloroaniline | 2. [phenyl-N(CH₃)(CH₂-pyridyl)] | Do. |

| Diazotization components | Coupling components | Shade on cellulose acetate |
|---|---|---|
| p-Aminoacetophenone | 3. [structure with OCH₃, N-H, CH(CH₃), N-C₂H₅, I] | Orange. |
| p-Nitroaniline | 4. [structure with OCH₃, N-C₂H₄OH, NO₂] | Rubine. |
| Do | 5. [structure with CH₃, N-C₃H₆OCH₃, CH₂, N, CH₃ groups] | Do. |
| p-Nitro-o-chloroaniline | 6. [structure with N-CH₂CHOHCH₂OH, CH₂, N, NO₂] | Do. |
| Do | 7. [structure with HO, N-H, CH₂, N] | Blue. |
| p-Nitro-o-bromoaniline | 8. [structure with Cl, N-CH₂-CH=CH₂, SO₂C₆H₅, N-CH₃] | Red. |
| Do | 9. [structure with OCH₃, Cl, N-CH₂-pyridyl, C₂H₄-pyridyl] | Rubine. |
| p-Nitro-o-hydroxyaniline | 10. [structure with OCH₃, CH₃, N-H, N] | Pinkish-red. |
| p-Nitro-o-methylsulfone aniline | 11. [structure with CH₃, N-C₂H₄OH, CH₂-CH₂-CH₂-N] | Violet. |
| p-Nitroaniline-o-sulphonic acid | 12. [structure with Cyclohexyl, N, Br, Cetyl] | Colors silk and wool red. |
| Do | Couplers 1–28 | Colors silk, wool, and cotton, orange-red to blue. |
| p-Nitro-anisidine | 13. [structure with CH₃, N-H, C₂H₅, N] | Orange. |
| p-Nitro-o-toluidine | 14. [structure with N-C₂H₅, CH₂, N] | Do. |
| 2,4-dinitroaniline | 15. [structure with CH₃, N-CH₂CHOHCH₂OH, N] | Violet. |

| Diazotization components | Coupling components | Shade on cellulose acetate |
|---|---|---|
| 2,4-dinitroaniline | 16. [structure: phenyl with CH$_3$, N-H, CH$_2$-pyridyl] | Violet. |
| 2,4-dinitro-6-chloroaniline | 17. [structure: naphthyl, N-H, CH$_2$-piperidyl] | Blue. |
| Do | 18. [structure: phenyl with OCH$_3$, CH$_3$; N(C$_2$H$_4$-pyridyl)(CH$_2$CHOHCH$_2$OCH$_3$)] | Reddish-blue. |
| Do | 19. [structure: naphthyl, N-H, CH$_2$-pyridyl] | Purple. |
| Do | 20. [structure: phenyl with HO, N-H, CH$_2$-piperidyl] | Blue-green. |
| Do | 21. [structure: phenyl with OCH$_3$, NHacyl; N-H, CH$_2$-pyridyl] | Blue. |
| 2,4-dinitro-6-bromoaniline | 22. [structure: phenyl with OCH$_3$, OCH$_3$; N(CH$_2$-pyridyl)(CH$_3$CHOH—CH$_2$OCH$_3$)] | Reddish-blue. |
| Benzidine | 23. [structure: naphthyl with SO$_3$H, N-H, pyridyl] | Colors silk and wool, orange. |
| Do | 24. [structure: phenyl, N(Cyclohexyl)(CH$_2$-piperidyl-N-H with SO$_3$H)] | Colors silk and wool, orange-yellow. |
| 2-amino-6-methoxybenzothiazole | 25. [structure: phenyl-N[cyclohexyl with two C$_3$H$_7$ groups]$_2$] | Red. |
| 1-amino-8-naphthol-4-sulfonic acid | 26. [structure: phenyl, N(C$_2$H$_5$)(CH$_2$-piperidyl with Br, Cetyl)] | Blue. |
| p-Aminoazobenzene | 27. [structure: phenyl with C$_2$H$_4$OCH$_3$, OCH$_3$; N, piperidyl with N-H, SO$_2$C$_2$H$_5$] | Red. |
| Do | 28. [structure: phenyl, N(C$_6$H$_5$)(CH$_2$-pyridyl)] | Orange-red. |

In the application of the azo compounds of our invention to the coloration of organic derivatives of cellulose, silk, cotton, and wool, the dye compound may be formed on the fiber by diazotizing the desired amine and coupling with the developer in situ, or the dye compound may first be prepared in the manner described and then applied to the material to be colored from an aqueous solution or suspension of the dye.

In general, the unsulfonated dye compounds of our invention are adapted to coloring organic derivatives of cellulose, while the sulfonated dye products are more adapted to the coloration of natural fibers represented by silk, wool, and cotton. For the dyeing of cellulose acetate, it will be found that most of the dyes of the invention are either water-soluble or self dispersing type of quaternary salts so that they can be applied directly from an aqueous solution containing salt without the necessity of employing a dispersing or solubilizing agent. Where the particular dye compound is only slightly or moderately soluble, however, it is first ground to a paste with a dispersing agent such as a soap, a sulfonated oil, or a higher fatty acid glyceryl sulfate, and the resulting paste then dispersed in water. The material to be colored is immersed in this dispersion starting with a bath temperature of approximately 45–55° C., and then gradually increasing the temperature to 80–85° C., at which point it is maintained for several hours. Sodium chloride may be added to facilitate exhaustion of the dye bath during the dyeing operation. When the material has acquired the desired shade, it is removed from the bath, washed with soap, rinsed and dried.

While our invention is illustrated more particularly in connection with cellulose acetate, a material to which the invention is especially adapted, it will be understood that the azo dye compounds above described are not limited exclusively to cellulose acetate, but are likewise applicable for coloring organic derivatives of cellulose in general, including both the hydrolyzed as well as the unhydrolyzed organic acid esters of cellulose such as cellulose formate, cellulose acetate, cellulose propionate, cellulose butyrate, and the hydrolyzed as well as the unhydrolyzed mixed organic acid esters of cellulose such as cellulose acetate-propionate, cellulose acetate-butyrate, and cellulose ethers such as methyl cellulose, ethyl cellulose, and benzyl cellulose.

We claim:

1. The azo compounds having the general formula:

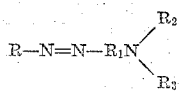

wherein R represents a member selected from the group consisting of an aryl nucleus of the benzene series, an aryl nucleus of the naphthalene series, an aryl nucleus of the azobenzene series, and an aryl nucleus of the benzene azo naphthalene series, $R_1$ represents a member selected from the group consisting of an aryl nucleus of the benzene series, and an aryl nucleus of the naphthalene series, $R_2$ represents a member selected from the group consisting of hydrogen, an alkyl group, a hydroxyalkyl group, an alkoxyalkyl group, an alkylene group, a cyclohexyl group, a phenyl group, and the group $R_3$, and $R_3$ represents a member selected from the group consisting of a pyridine nucleus joined to N by a nuclear carbon atom which is ortho, meta, or para to the nuclear nitrogen of the said nucleus, and a pyridine nucleus joined to N through a carbon atom of a short chain hydrocarbon group which is ortho, meta, or para to the nuclear nitrogen of the said nucleus.

2. The azo compounds having the general formula:

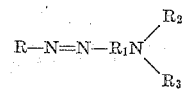

wherein R represents a member selected from the group consisting of an aryl nucleus of the benzene series, an aryl nucleus of the naphthalene series, an aryl nucleus of the azobenzene series, and an aryl nucleus of the benzene azonaphthalene series, $R_1$ represents a member selected from the group consisting of an aryl nucleus of the benzene series, and an aryl nucleus of the naphthalene series, $R_2$ represents a member selected from the group consisting of hydrogen, an alkyl group, a hydroxyalkyl group, an alkoxyalkyl group, an alkylene group, a cyclohexyl group, a phenyl group, and the group $R_3$, and $R_3$ represents a pyridine nucleus joined to N by a nuclear carbon atom which is ortho, meta, or para to the nuclear nitrogen of the said nucleus.

3. The azo compounds having the general formula:

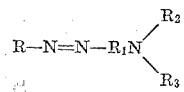

wherein R represents a member selected from the group consisting of an aryl nucleus of the benzene series, an aryl nucleus of the naphthalene series, an aryl nucleus of the azobenzene series, and an aryl nucleus of the benzene azonaphthalene series, $R_1$ represents a member selected from the group consisting of an aryl nucleus of the benzene series, and an aryl nucleus of the naphthalene series, $R_2$ represents a member selected from the group consisting of hydrogen, an alkyl group, a hydroxyalkyl group, an alkoxyalkyl group, an alkalene group, a cyclo hexyl group, a phenyl group, and the group $R_3$, and $R_3$ represents a pyridine nucleus joined to N through a carbon atom of a short chain hydrocarbon group which is ortho, meta, or para to the nuclear nitrogen of the said nucleus.

4. The azo compounds having the general formula:

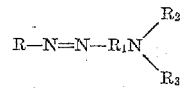

wherein R and $R_1$ each represents an aryl nucleus of the benzene series, $R_2$ represents a member selected from the group consisting of hydrogen, an alkyl group, a hydroxyalkyl group, an alkoxyalkyl group, an alkylene group, a cyclohexyl group, a phenyl group, and the group $R_3$, and $R_3$ represents a member selected from the group consisting of a pyridine nucleus joined to N by a nuclear carbon atom which is ortho, meta, or para to the nuclear nitrogen of the said nucleus, and a pyridine nucleus joined to N through a carbon atom of a short chain hydrocarbon group which is ortho, meta, or para to the nuclear nitrogen of the said nucleus.

5. The azo compounds having the general formula:

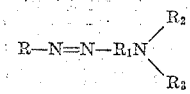

wherein R and R₁ each represents an aryl nucleus of the benzene series, R₂ represents a member selected from the group consisting of hydrogen, an alkyl group, a hydroxyalkyl group, an alkoxyalkyl group, an alkylene group, a cyclohexyl group, a phenyl group, and the group R₃, and R₃ represents a pyridine nucleus joined to N by a nuclear carbon atom which is ortho, meta, or para to the nuclear nitrogen of the said nucleus.

6. The azo compounds having the general formula:

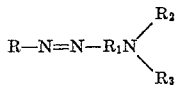

wherein R and R₁ each represents an aryl nucleus of the benzene series, R₂ represents a member selected from the group consisting of hydrogen, an alkyl group, a hydroxyalkyl group, an alkoxyalkyl group, an alkylene group, a cyclohexyl group, a phenyl group, and the group R₃, and R₃ represents a pyridine nucleus joined to N through a carbon atom of a short chain hydrocarbon group which is ortho, meta, or para to the nuclear nitrogen of the said nucleus.

7. The non-sulfonated nuclear azo compounds having the general formula:

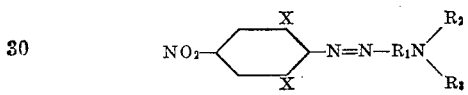

wherein each X represents a member selected from the group consisting of hydrogen, a halogen, and a nitro group, R₁ represents an aryl nucleus of the benzene series, R₂ represents a member selected from the group consisting of hydrogen, an alkyl group, a hydroxyalkyl group, an alkoxyalkyl group, an alkylene group, a cyclohexyl group, a phenyl group, and the group R₃, and R₃ represents a member selected from the group consisting of a pyridine nucleus joined to N by a nuclear carbon atom which is ortho, meta, or para to the nuclear nitrogen of the said nucleus, and a pyridine nucleus joined to N through a carbon atom of a short chain hydrocarbon group which is ortho, meta, or para to the nuclear nitrogen of the said nucleus.

8. Material made of or containing an organic derivative of cellulose colored with a dye selected from the class of non-sulfonated nuclear azo compounds having the general formula:

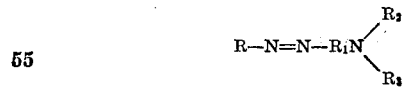

wherein R represents a member selected from the group consisting of an aryl nucleus of the benzene series, an aryl nucleus of the naphthalene series, an aryl nucleus of the azobenzene series, and an aryl nucleus of the benzene azo naphthalene series, R₁ represents a member selected from the group consisting of an aryl nucleus of the benzene series, and an aryl nucleus of the naphthalene series, R₂ represents a member selected from the group consisting of hydrogen, an alkyl group, a hydroxyalkyl group, an alkoxyalkyl group, an alkylene group, a cyclohexyl group, a phenyl group, and the group R₃, and R₃ represents a member selected from the group consisting of a pyridine nucleus joined to N by a nuclear carbon atom which is ortho, meta, or para to the nuclear nitrogen of the said nucleus, and a pyridine nucleus joined to N through a carbon atom of a short chain hydrocarbon group which is ortho, meta, or para to the nuclear nitrogen of the said nucleus.

group which is ortho, meta, or para to the nuclear nitrogen of the said nucleus.

9. Material made of or containing cellulose acetate colored with a dye selected from the class of non-sulfonated nuclear azo compounds having the general formula:

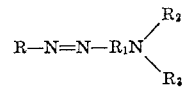

wherein R represents a member selected from the group consisting of an aryl nucleus of the benzene series, an aryl nucleus of the naphthalene series, an aryl nucleus of the azobenzene series, and an aryl nucleus of the benzene azo naphthalene series, R₁ represents a member selected from the group consisting of an aryl nucleus of the benzene series, and an aryl nucleus of the naphthalene series, R₂ represents a member selected from the group consisting of hydrogen, an alkyl group, a hydroxyalkyl group, an alkoxyalkyl group, an alkylene group, a cyclohexyl group, a phenyl group, and the group R₃, and R₃ represents a member selected from the group consisting of a pyridine nucleus joined to N by a nuclear carbon atom which is ortho, meta, or para to the nuclear nitrogen of the said nucleus, and a pyridine nucleus joined to N through a carbon atom of a short chain hydrocarbon group which is ortho, meta, or para to the nuclear nitrogen of the said nucleus.

10. Material made of or containing an organic derivative of cellulose colored with a dye selected from the class of non-sulfonated nuclear azo compounds having the general formula:

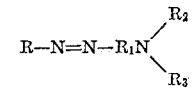

wherein R and R₁ each represents an aryl nucleus of the benzene series, R₂ represents a member selected from the group consisting of hydrogen, an alkyl group, a hydroxyalkyl group, an alkoxyalkyl group, an alkylene group, a cyclohexyl group, a phenyl group, and the group R₃, and R₃ represents a member selected from the group consisting of a pyridine nucleus joined to N by a nuclear carbon atom which is ortho, meta, or para to the nuclear nitrogen of the said nucleus, and a pyridine nucleus joined to N through a carbon atom of a short chain hydrocarbon group which is ortho, meta, or para to the nuclear nitrogen of the said nucleus.

11. Material made of or containing cellulose acetate colored with a dye selected from the class of non-sulfonated nuclear azo compounds having the general formula:

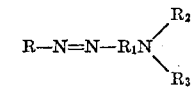

wherein R and R₁ each represents an aryl nucleus of the benzene series, R₂ represents a member selected from the group consisting of hydrogen, an alkyl group, a hydroxyalkyl group, an alkoxyalkyl group, an alkylene group, a cyclohexyl group, a phenyl group, and the group R₃, and R₃ represents a member selected from the group consisting of a pyridine nucleus joined to N by a nuclear carbon atom which is ortho, meta, or para to the nuclear nitrogen of the said nucleus, and a pyridine nucleus joined to N through a carbon atom of a short chain hydrocarbon group which is ortho, meta, or para to the nuclear nitrogen of the said nucleus.

12. Material made of or containing an organic derivative of cellulose colored with a dye selected from the class of non-sulfonated nuclear azo compounds having the general formula:

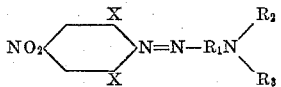

wherein each X represents a member selected from the group consisting of hydrogen, a halogen, and a nitro group, $R_1$ represents an aryl nucleus of the benzene series, $R_2$ represents a member selected from the group consisting of hydrogen, an alkyl group, a hydroxyalkyl group, an alkoxyalkyl group, an alkylene group, a cyclohexyl group, a phenyl group, and the group $R_3$, and $R_3$ represents a member selected from the group consisting of a pyridine nucleus joined to N by a nuclear carbon atom which is ortho, meta, or para to the nuclear nitrogen of the said nucleus, and a pyridine nucleus joined to N through a carbon atom of a short chain hydrocarbon group which is ortho, meta, or para to the nuclear nitrogen of the said nucleus.

13. Material made of or containing cellulose acetate colored with a dye selected from the class of non-sulfonated nuclear azo compounds having the general formula:

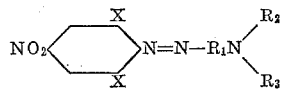

wherein each X represents a member selected from the group consisting of hydrogen, a halogen, and a nitro group, $R_1$ represents an aryl nucleus of the benzene series, $R_2$ represents a member selected from the group consisting of hydrogen, an alkyl group, a hydroxyalkyl group, an alkoxyalkyl group, an alkylene group, a cyclohexyl group, a phenyl group, and the group $R_3$, and $R_3$ represents a member selected from the group consisting of a pyridine nucleus joined to N by a nuclear carbon atom which is ortho, meta, or para to the nuclear nitrogen of the said nucleus, and a pyridine nucleus joined to N through a carbon atom of a short chain hydrocarbon group which is ortho, meta, or para to the nuclear nitrogen of the said nucleus.

JOSEPH B. DICKEY.
WILLIAM H. STRAIN.